(12) United States Patent
Harvey et al.

(10) Patent No.: US 8,909,659 B2
(45) Date of Patent: Dec. 9, 2014

(54) DIRECTORY SYSTEM AND METHOD OF SEARCHING INFORMATION

(75) Inventors: Richard H. Harvey, Victoria (AU); Justin J. McDonald, Tasmania (AU)

(73) Assignee: CA, Inc., Islandia, NY (US)

( * ) Notice: Subject to any disclaimer, the term of this patent is extended or adjusted under 35 U.S.C. 154(b) by 889 days.

(21) Appl. No.: 12/331,610

(22) Filed: Dec. 10, 2008

(65) Prior Publication Data

US 2009/0150360 A1    Jun. 11, 2009

Related U.S. Application Data

(60) Provisional application No. 61/012,682, filed on Dec. 10, 2007.

(51) Int. Cl.
*G06F 7/00* (2006.01)
*G06F 17/30* (2006.01)

(52) U.S. Cl.
CPC .............. *G06F 17/30961* (2013.01)
USPC ............... 707/758; 707/797; 707/831

(58) Field of Classification Search
USPC ............ 707/999.003, 758, 797, 831
See application file for complete search history.

(56) References Cited

U.S. PATENT DOCUMENTS

| | | | |
|---|---|---|---|
| 7,761,439 B1 * | 7/2010 | Auerbach | 707/706 |
| 7,912,842 B1 * | 3/2011 | Bayliss | 707/749 |
| 2002/0078005 A1 * | 6/2002 | Shi et al. | 707/1 |
| 2005/0091205 A1 * | 4/2005 | Sidlosky et al. | 707/3 |
| 2008/0147631 A1 * | 6/2008 | Leffingwell et al. | 707/5 |
| 2009/0112849 A1 * | 4/2009 | Jung et al. | 707/5 |

OTHER PUBLICATIONS

Kumar, Apurva, "Filter Based Directory Replication: Algorithms and Performance," IBM India Research Lab, http://www.cecs.uci.edu/~papers/icdcs05/56_kumara_directory.pdf, 12 pages, Jun. 10, 2005.
Harvey et al., "A Directory Partitioned System and Method," U.S. Appl. No. 12/351,300, filed Jan. 9, 2009, 23 pages, drawings—2 pages, Jan. 9, 2009.
Harvey et al., "Directory and Methods of Use," U.S. Appl. No. 12/331,616, filed Dec. 10, 2008, 29 pages, drawings—2 pages, Dec. 10, 2008.

* cited by examiner

*Primary Examiner* — Hosain Alam
*Assistant Examiner* — Jieying Tang
(74) *Attorney, Agent, or Firm* — Baker Botts, LLP

(57) ABSTRACT

A method of executing an operation in a directory information system, includes performing a first operation within a directory information system in accordance with a predetermined procedure, where the first operation comprising a search for one or more of a plurality of directory objects. The plurality of directory objects are stored in a computer-readable medium that has a directory information structure. In one particular embodiment, the search generates one or more first results. The method also includes performing a second operation within the directory information system in accordance with the predetermined procedure. The second operation uses at least a portion of the one or more first results generated by the search for the one or more of the plurality of objects. In this embodiment, the second operation generates one more second results. The method further includes returning the one or more second results based at least in part on the second operation.

24 Claims, 1 Drawing Sheet

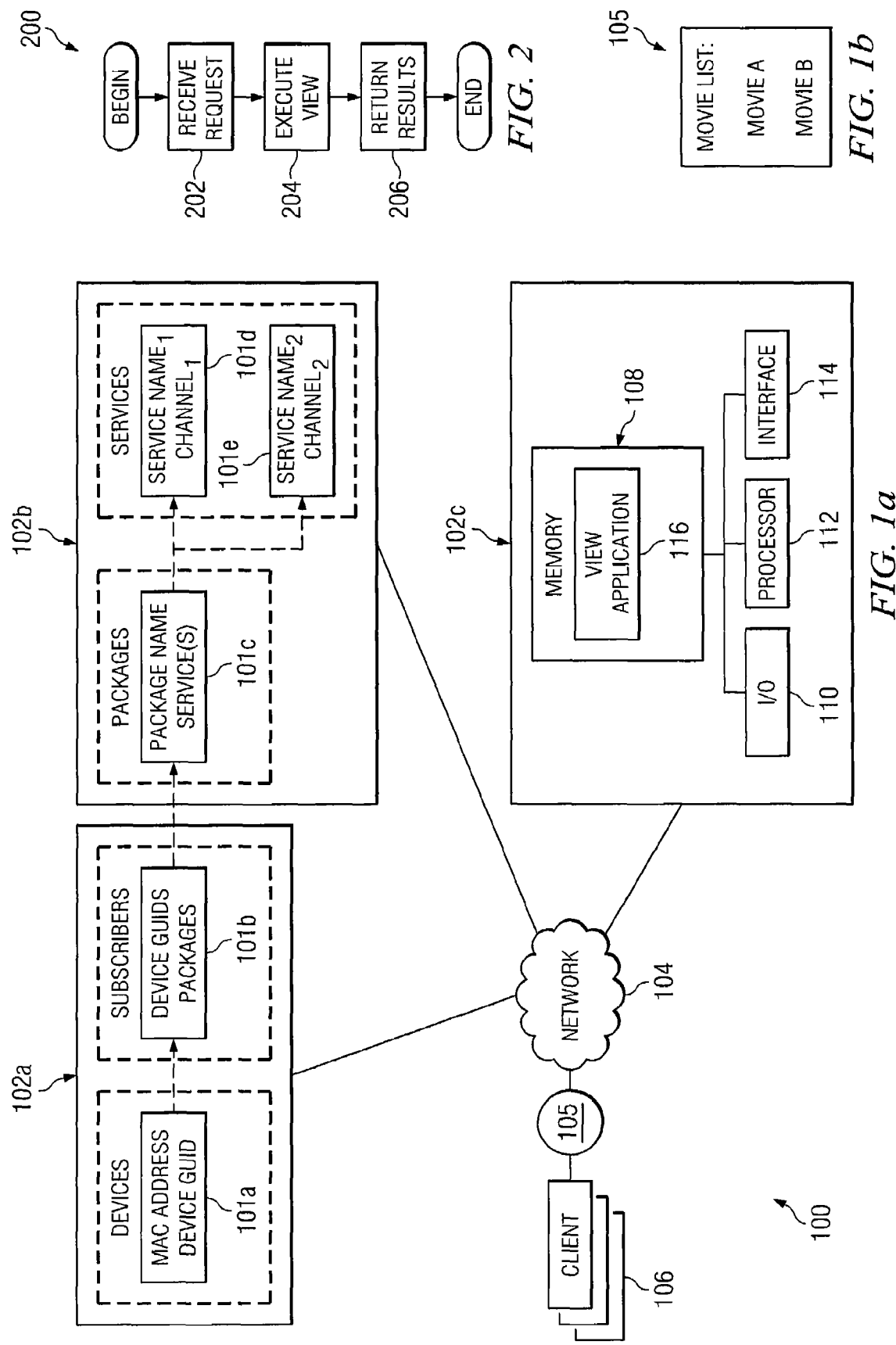

DIRECTORY SYSTEM AND METHOD OF SEARCHING INFORMATION

RELATED APPLICATION

This application claims benefit under 35 U.S.C. §119(e) of U.S. Provisional Application Ser. No. 61/012,682, entitled "A DIRECTORY SYSTEM AND METHOD OF SEARCHING INFORMATION" filed Dec. 10, 2007, by Richard H. Harvey et al.

TECHNICAL FIELD

This disclosure relates in general to the field of directory systems and/or services, and more particularly to a method, system, and apparatus for searching information in a directory.

BACKGROUND

In conventional directory systems, one way of representing computer-readable data is in a hierarchical tree-like structure of a directory-based system, commonly referred to as a Directory Information Tree (DIT). Some directory-based systems are limited for a variety of reasons. For example, objects of some conventional directories may be organized in a rigid hierarchy that uses a fixed relationship structure. Some directories may include information that is distributed across multiple servers, which in some cases may complicate searching for particular items of information. Therefore, objects that have complex inter-relationships are not typically stored in directory-based systems.

Another limitation of conventional directory-based systems is that an effective information search in the directory environment typically involves an understanding of the system architecture, especially if data is scattered between multiple directories or servers. In some cases, directory applications may need to do a large amount of work in order to resolve complex interrelationships between objects of a directory-based system. These example limitations and others may inhibit the searching capabilities of some directory-based systems.

SUMMARY

In a method embodiment, a method of executing an operation in a directory information system, comprises performing a first operation within a directory information system in accordance with a predetermined procedure, where the first operation comprising a search for one or more of a plurality of directory objects. The plurality of directory objects are stored in a computer-readable medium that has a directory information structure. In one particular embodiment, the search generates one or more first results. The method also comprises performing a second operation within the directory information system in accordance with the predetermined procedure. The second operation uses at least a portion of the one or more first results generated by the search for the one or more of the plurality of objects. In this embodiment, the second operation generates one more second results. The method further comprises returning the one or more second results based at least in part on the second operation.

Numerous technical advantages are provided according to various embodiments of the present disclosure. Particular embodiments of the disclosure may exhibit none, some, or all of the following advantages depending on the implementation. For example, some embodiments may be capable of generating Views of a directory that they may represent directory data in a way that differs from how the directory data is actually organized within the directory. Some such embodiments may reduce the complexity associated with building and maintaining applications for a directory information system. In various embodiments, the underlying data of a directory may be modified without necessarily rewriting searching applications. In other words, some applications may be insulated from how a directory is laid out. In some embodiments, copied information may be normalized into separate entries using cross-references, which may reduce the size of some directories. Various embodiments may provide a general mechanism of joining data, including resolving chains of interdependencies and/or relationships between objects of a directory. Particular embodiments may be capable of executing a "cascading search" of a directory.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIG. 1A is one example of a block diagram of a portion of a directory information system capable of storing and retrieving objects that may be logically interrelated or "linked" together;

FIG. 1B is one example of a View of directory information corresponding to the directory information system of FIG. 1A; and FIG. 2 is one example embodiment of a flowchart illustrating example steps concerning the representation of information from multiple linked data sources via one or more requests.

DETAILED DESCRIPTION

The present disclosure relates generally to the field of directory information systems and/or services (e.g., The Domain Name System (DNS)), and more particularly to a method, system, and apparatus for searching information in a directory. In some embodiments, a directory system and/or service may enable the look up of a name and information associated with that name. Some such names may be associated with multiple, different pieces of information; and may have many different types of data. In various embodiments, a directory system and/or service may include software encoded in computer-readable medium that may be operable, when executed by one or more processors, to store, organize and/or provide access to information in a directory. Some embodiments may use standardized directory server technologies, such as, for example, Lightweight Directory Access Protocol (LDAP), X.500 and/or Directory Service Markup Language (DSML); however, any technology or standard, including future technologies or standards, may be used without departing from the scope of the present disclosure.

Particular embodiments of the present disclosure may be capable of performing one or more of the following steps: defining and/or executing cascading searches within a directory information system/service; executing a stored procedure for a directory information system/service; and/or implementing processes for a directory class of services. Particular embodiments of the present disclosure may be capable of executing a variety of directory Views. As used throughout this document, the term "View" refers to a routine that may be capable of representing, or may otherwise be capable of searching for, one or more directory objects and/or logical interrelationships between multiple objects that may be stored, written, and/or read by a directory information system and/or service. Some such Views may be used, for example, to resolve chains of interdependencies and/or interrelationships between entries in a directory-based information system. Some embodiments may be capable of exploring multiple subtrees in a directory by defining corresponding Views. Some Views may be "virtual" or "fabricated" in that they may represent information in a way that differs from how the directory data is actually organized.

In one particular embodiment, information, such as a request, is received and processed; and based on a result, further searches may be defined and one or more additional results may be returned. The example embodiments of the present disclosure are best understood by referring to FIGS. 1A through 2 of the drawings, like numerals being used for like and corresponding parts of the various drawings.

FIG. 1A is a block diagram illustrating one example of a portion of a directory information system 100 capable of storing and retrieving directory objects 101 that may be logically interrelated or "linked" together. For example, directory objects 101 may be logically linked in a hierarchical or tree-like structure that may support 1:1, 1:n, n:1, and/or n:n interrelationships between entries. In this particular embodiment, the illustrated portion of directory information system 100 includes one or more servers 102 coupled through a network 104 to one or more clients 106. As used throughout this document, the term "couple" and/or "coupled" refers to any direct or indirect communication between two or more elements, whether or not those elements are in physical contact with one another.

In various embodiments, each of the directory objects 101 may include one or more entries, such as data and/or logic, embodied or stored within a computer-readable medium of directory information system 100. In this particular example, directory objects 101 include information corresponding to a pay television service that involves devices, subscribers, packages, and services. Although directory objects 101 include information corresponding to pay television services in this example, directory information system 100 may be capable of storing and retrieving any suitable directory object(s) 101 arranged in any suitable configuration or structure without departing from the scope of the present disclosure. For example, various embodiments may implement a "one-to-many" (1:n) logical configuration illustrated in FIG. 1A, while other alternative embodiments, may implement one or more logical iterative expansion at some or all of the links, such as, for example, a 1:1, n:1, and/or n:n logical iterative expansion. In other words, although FIG. 1A illustrates a particular example of how directory objects 101 may be logically linked together, any of a variety of alternative links or data may be used without departing from the scope of the present disclosure. In this example, each directory object 101 resides at one or more respective servers 102; however, directory objects 101 may reside at any suitable location, such as, for example, at one or more databases external to servers 102, within removable media, or at some other suitable location capable of storing directory objects 101.

Servers 102 may comprise any hardware, software, firmware, or combination thereof capable of storing and/or retrieving directory objects 101. In various embodiments, servers 102 may include, for example, one or more directory servers, client servers, file servers, domain name servers, proxy servers, web servers, application servers, computer workstations, handheld devices, databases, some other data repository, any combination of the preceding, or any other machine(s) or apparatus capable of storing and/or retrieving directory objects 101. Servers 102 may execute with any of the well-known MS-DOS, PC-DOS, OS-2, MAC-OS, WINDOWS™, UNIX, or other appropriate operating systems, including future operating systems.

In the illustrated embodiment, server 102c includes memory 108, input/output functionality 110, one or more processors 112, an interface 114, and a View Application 116. Although server 102c includes memory 108, input/output functionality 110, one or more processors 112, and an interface 114 in this example, one or more of memory 108, input/output functionality 110, one or more processors 112, and an interface 114 can be excluded from server 102c without departing from the scope of the present disclosure. In this example, at least a portion of View Application 116 resides within memory 108 of server 102c; however, all or a portion of View Application 116 may alternatively reside at any other suitable location, such as, for example, external to server 102c; and View Application 116 may be embodied in any of a variety of other suitable computer-readable medium, such as, for example, removable media. View application 116 may comprise, for example, software, firmware, code, portions of code, data compilations, and/or a combination of these or any other type of data.

In some embodiments, some or all of the functionality and/or structure of servers 102a, 102b, and 102c may be embodied in a single device, or in one or more other devices not illustrated in FIG. 1A. In some such embodiments, the communication between servers 102a, 102b, and/or 102c may be performed internally, such as, for example, via a system bus. In this example, servers 102a, 102b, and 102c are all communicatively coupled to each other through a network 104.

Memory 108 may, for example, comprise a dynamic random access memory (DRAM), a static random access memory (SRAM), a NAND flash memory, or any other suitable volatile or nonvolatile storage and retrieval device or combination of devices. Memory 108 may comprise any number of storage media without departing from the scope of the present disclosure. Additionally, all or part of memory 108 could reside locally within server 102c or could reside in a location remote from and accessible to server 102c.

Input/output functionality 110 may refer, for example, to the communication between server 102c and one or more other devices (e.g., one or more of clients 106, a display, or another information processing system). Some inputs may refer to the signals or data received by server 102c, and some outputs may refer to the signals or data communicated by server 102c. These terms may also refer to part of an action. For example, to "perform I/O" may involve performing an input or output operation. In some cases, devices for communication between servers 102c and/or clients 106 may be used to effect both input and output functionality.

Interface 114 may comprise, for example, any device(s) that may be used (e.g., by a person, or by another device or system) to communicate with server 102c. For example, keyboards and mice may be considered input interfaces of server 102c, while monitors and printers may be considered output interfaces of server 102c.

In this example, one or more servers 102 can communicate with one or more clients 106 through network 104. Network 104 may comprise any wireless network, wireline network, or combination of wireless and wireline networks capable of supporting communication between network elements using ground-based and/or space-based components. In various embodiments, network 104 may be capable of transmitting audio, video, signals, data, messages, or any combination of these or other communication signals. For example, network 104 may comprise a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations.

Each client 106 may comprise any computing and/or communication device capable of enabling the communication of information to and/or from network 104 or another component in system 100. Client 102 may comprise, for example, a wireless device, a voice over IP device, a desktop computer, a laptop computer, a personal digital assistant, a cell-phone, a telephone, a Wi-Fi device, a workstation, a mainframe computer, a mini-frame computer, a web server, or any other computing and/or communicating device. In some embodiments, client 106 may enable a user of system 100 to communicate information to and/or receive information from one or more servers 102. In other embodiments, clients 102 can enable a user of system 100 to communicate information to and/or receive information from one or more components of system 100. In some embodiments, the communication between a particular client 106 and one or more of the servers 102 may be performed internally, such as, for example, via a system bus. In this example, clients 106 may each be capable of communicating one or more requests through network 104, which request(s) may be received and processed, for example, by server 102c using View Application 116.

In this example, View Application 116 is generally operable, when executed by one or more processors 112, to execute a View of directory information system 100. As used throughout this document, the term "View" refers to a routine that may be capable of representing, or may otherwise be capable of searching for, one or more directory objects 101 and/or logical links between multiple directory objects 101 that may be stored and/or retrieved by directory information system 100. Some Views may be thought of in terms of a View object, a View search, and/or a View entry. A View search may refer, for example, to a search received by one of servers 102 (e.g., server 102c) requesting a particular view; and a View entry may refer, for example, to a particular entry or a particular directory object 101 that may be searched to invoke a corresponding View. As explained further below, the results of various Views may be communicated to one or more clients 106 view network 104.

In some cases, View entries and/or objects may be "virtual" or "fabricated" in that they may represent directory data in a way that differs from how the directory data is actually organized. For example, a portion of a particular directory information system 100 may comprise information pertaining to hierarchical units and people objects of an organization. A user may wish, however, to browse the organization of the directory by location. Accordingly, a View may be executed that, when displayed, may give the impression that the directory is organized by location in a manner that differs from how the directory is actually organized. In another example, View Application 116 may execute a View of one or more customers sets based on attributes in the customer entries as if those attributes formed a hierarchy when in actuality they do not. Such "virtual" or "fabricated" Views may be particularly useful, for example, in some larger, complex directories.

One particular example of a directory View may be explained with reference to the illustrated example of FIGS. 1A and 1B. In this particular example, a user may wish to watch a pay-per-view movie at home but may be unaware of the potential choices. Accordingly, the user may press a "movie select" button on a remote control, for example, which communicates wirelessly with a set top box. Thus, in this example, the remote control and/or the set top box may be considered either individually or collectively as a client 106. Although the user only presses a single button, in this example, such an event may trigger any of a variety of complex and/or cascading searches at the server-side of directory information system 100, though the user may not be aware of such activity.

For example, the set top box may respond to the button selection by communicating a "MACAddress" to server 102c via network 104. View Application 116 may respond, for example, by mapping the MACAddress to a particular subscriber profile concerning that user; and View application 116 may also determine various profile parameters concerning that particular subscriber profile. For example, the profile may be queried to determine one or more service packages, which may then be used to determine one or more movies or movie channels the user can access (e.g., Channel$_1$, Channel$_2$, etc.). In some cases, the results may be pruned according to one or more profile parameters. For example, the user profile may have various parental controls selected that limit access to particular channels under certain conditions. View Application 116 may return results from such a pruned View, for example; and these results may be presented to the user via a display in communication with the set top box.

As shown in FIG. 1B, for example, the results may be returned as a "virtual" or "fabricated" View 105 that includes "Movie A" and "Movie B" choices subordinate to a "Movie List" parent category, though directory information system 100 may not necessarily include such an organization. That is, in this particular example, directory information system 100 may execute "virtual" or "fabricated" View 105 in real time using directory objects 101, their logical links, and temporarily associated data, though View 105 may differ from the "real" hierarchical organization of directory information system 100. Some "virtual" or "fabricated" Views may thus be dynamic in that the contents of the View object, search, and/or entry may depend on the operation that invokes the View.

In this particular example, for instance, various different users may see various different Views, though each user may have provided the same or substantially similar inputs to invoke their respective Views. For example, some users may be presented Views having differing movie lists; and some other users may be presented Views of information pertaining to services and/or packages other than movies. In addition, different Views may be returned to the same user at different times, though the user may invoke these time-delayed Views using the same or substantially similar inputs (e.g., the same button press on the remote control at different times).

Thus, in this example, a simple request is triggered by a button press, which is then automatically mapped into a more complex search of a directory-based information system 100 that may involve multiple conditional, dependent, and/or cascading queries. In some cases, the user may be unaware of such system-side processing and/or of the underlying organization of the directory information system 100.

In some cases, the generation of Virtual Directories, or "fabricated" Views, and the communication of the same to clients 106, may be implemented, at least in part, by View Application 116. The process of generating such a Virtual Directory may include one or more of the following example steps or features: schema mapping (e.g., the ability to manage alternate names for attributes); directory object merger and creation (e.g., the ability to fabricate one or more new directory objects using at least portions of one or more base directory objects); and external data retrieval (e.g., the ability to make non-directory data sources visible inside a directory). Some such capabilities may be provided in a manner that insulates applications from changes in the structure or schema of directory information system 100 and/or insulates directory information system 100 from applications that query/view data in a particular way.

In various embodiments, the execution of "real" and/or "virtual" Views may directly involve or otherwise enable one or more of the following example routines: generating a new View; modifying an existing View; querying a View; resolving chains of interdependencies and/or relationships between directory objects 101; analyzing complex relational concepts of directory objects 101; implementing a "cascading search;" some other routine concerning searching or otherwise representing information of a directory information system 100; etc. In various embodiments, at least some of these example routines may be performed, for example, in accordance with one or more procedures that may, for example, be predetermined and/or dynamically modified; and in some cases an existing View may inherently comprise a procedure that may be used to generate another View.

Performing operations on a directory information system 100 in a manner substantially similar or analogous to the examples described above may provide any of a variety of advantages. For example, the complexity associated with building and maintaining applications may be reduced in some embodiments. In addition, the underlying data can be modified with a View configuration change rather than an application rewrite. In other words, some applications may be insulated from how a particular directory may be laid out. In some embodiments, copied information may be normalized into separate entries using cross-references, for example, which may reduce the size of some directory systems. Additional details associated with executing Views of a directory information system 100 are described further below with reference to FIG. 2.

example, flowchart 200 generally includes the steps of triggering a particular View, executing the View, and returning results. In some embodiments, all or a portion of the example steps 202-206 of flowchart 200 may be implemented, at least in part, by a processor 112 capable of executing instructions communicated by View Application 116.

In this example, flowchart 200 begins when a request is received at one of servers 102 in step 202. For example, server 102c may receive a request that involves the retrieval of particular items of information possibly stored within directory information system 100. In that example, server 102c passes the request to view application 116 for processing. In some embodiments, the request may be in the form of an event trigger or a query, either of which may be generated or received, for example, by View Application 116.

In this example, a View is executed in step 204. For example, View Application 116 may respond to the request of step 202 by querying or otherwise generating a View or a View template in accordance with a predetermined procedure. Such a predetermined procedure may include, for example, parsing a received request to determine a Distinguished Name (DN), an attribute or attribute name, filter parameters associated with an LDAP query, etc. In some embodiments, the execution of a View may be triggered, for example, by retrieving an associated object in the directory. Such an object need not be stored as an entry within directory information system 100, though the object may otherwise be implemented temporarily in a memory entry. Regardless, the View object may appear as an ordinary directory object to a directory client; and standard directory operations may be performed on the View object. In executing a View, the execution of another View may be triggered. For example, the execution of a View template generated in step 202 may involve invoking multiple phases of a query, which may further involve conditional and/or branching decisions.

In this example, results are returned in step 206. For example, the View executed in step 204 may return all the selected and/or pruned results corresponding to a multiple phased query.

The following command language illustrates how some example Views may be configured or defined in accordance with particular embodiments.

```
<assocSet>         ::=   view <viewDef>
<viewDef>          ::=   <string> = { description = <string>
                         entry = <DN> <viewOptions> <viewDefList> }
<viewOptions>      ::=   options = <viewOptionItem> | NULL
                         collapse-result | collapse-result-under-view-dn
<viewDefList>      ::=   <viewDefItem> | <viewDefItem>, <viewDefList>
<viewDefItem>      ::=   (phase = <num> subtree = <DN> <viewScope> filter =
                         <string> <viewEis> <viewAttrAllow>
                         <viewAttrPrune> <viewDefOptions> )
<viewScope>        ::=   scope = <viewScopeItem> | NULL
<viewScopeItem>    ::=   base | one-level | subtree
<viewEis>          ::=   eis = <attrTypeSet> | NULL
<viewAttrAllow>    ::=   allow-attr = <string>
                         allow-target = <string> | NULL
<viewAttrPrune>    ::=   prune-attr = <string>
                         prune-target = <string> | NULL
<viewDefOptions>   ::=   options = <viewOptList> | NULL
<viewOptList>      ::=   <viewOptItem> | <viewOptItem>, <viewOptList>
<viewOptItem>      ::=   ignore-from-result | result-required | prune-from-result
```

FIG. 2 is one example embodiment of a flowchart 200 illustrating example steps concerning representing information from multiple linked data sources via one or more requests. Some such representations, or Views, may be implemented as objects in a directory, such as, for example, within directory information system 100 of FIG. 1A. In this The following description provides some detail with regard to terms used and steps that may be performed by some example embodiments using the above command language. Various embodiments may use all, some, or none of the following features.

description: may describe the View and/or may define a purpose for the View.

entry: may define the DN of the View object, which in some cases may be the target of searches that invoke the View.

collapse-result-under-view-dn: an option that, when selected, may cause all entries returned by the View to be merged into a single entry with the base object equaling the View entry.

collapse-result: an option that, when selected, may cause all the entries returned by multi-phased searches to be merged into a single entry with the base object equaling the entry returned by a first phase. An error may be given, for example, where the first phase returns multiple entries.

phase: a label for one of the steps in the sequence of a View procedure (e.g., a number starting from 1 and incrementing by 1). Assigning a label to each phase, for example, may facilitate referencing results from a particular phase by another phase.

subtree: identifies the subtree of the search performed for the specified phase. The subtree relative distinguished name (RDN) elements can reference previous search phases. For example:
"$1:dn" may perform a search with a subtree set to the DN of each search result returned in phase 1;
"$1:dn[3]" may perform a search with a subtree set to the 3 top RDNs of the DN of each search result returned in phase 1; and
"uid=$1:uids,o=Democorp,c=AU" may replace the last RDN of the subtree with the value/s of 'uids' returned by the phase 1 search. If multiple values are returned then multiple searches may be performed.

scope: optionally identifies the type of search being performed for the specified phase.

For example:
"base" may identify a search for a base object only;
"one-level" may identify a search for one level only; and
"subtree" may search the entire subtree, which in some cases may be the default.

filter: may identify an LDAP search filter that contains substitution items. In some embodiments, the filter may be an option available to searches having a scope that is identified as "base" or "one-level." In some cases, the filter may be ignored, for example, when the scope of the search invoking the view is the base object.
Phase 1: specifies the substitution item should be "$attrName," meaning "attrName" is passed in on the subtree search for the View entry.
Phase >1: specifies that the substitution item should be "$phase:attrName." The "$phase" may reference the result from an earlier phase and "attrName" refers to the name of that attribute.

Entry Information Selection (EIS): optionally allows only a list of specified attributes, if any, to be returned on a search. This does not necessarily need to include a linking attribute (i.e., an attribute from a search result of one phase whose value may be used by another phase). If an EIS is left unspecified, for example, a phase search may return all attributes. In some embodiments, if the View search specifies an EIS then the "eis" item may be ignored.

allow-attr: optionally identifies the attribute value that may be included in a search result.

allow-target: optionally identifies a range of target attribute values that may be included in the search result. For example, the range of target attribute values may be defined, at least in part, by the target value.

prune-attr: identifies the attribute value that may be used for an attribute-level prune. A portion of an attribute can also be used, for example, with square bracket notation of the form jc:ni, where c is the delimiter and n is the nth delimited component (e.g., cstRestrictedServices[1:1]).

prune-target: optionally identifies the target attribute type that may be used in the execution of a pruning operation.

ignore-from-result: an option that, when selected, identifies the phase search results as temporary. In some embodiments, if the option is selected the results from the phase may not be returned to the client.

result-required: an option that may check referential integrity. For example, if a link between directory objects is determined to be broken then the search may be refused and an alarm raised.

prune-from-result: an option that, when selected, removes the entries returned by a corresponding phase from the final result.

One particular example View that may use command language substantially similar or analogous to all, some, or none of the above command language can be described further with reference to FIG. 1A. As shown in FIG. 1A, a particular View may be defined such that a search for a "MACAddress" returns the various movies or Channel entries that a corresponding user can access (e.g., $Channel_1$ and $Channel_2$). FIG. 1A show one example "data model" of how the directory objects 101 may be logically interrelated by a particular View. In this example, each directory object 101 may be accessed by a separate search, or "phase." When each phase completes, then subsequent phases can be performed that rely on the values returned. For example, a first phase search may retrieve the "DevGuid" of directory object 101a; and a second phase search may retrieve Packages of directory object 101b using the returned "DevGuid," etc. According to a particular embodiment, one example View using the above command language may be represented in a manner substantially similar to the following:

```
set view "Channel list" = {
    description = "Display list of channels for a given MACAddress"
    entry = <c AU><o Views><cn "Channel list">
    ( phase    = 1
      subtree  = "o=Devices,c=AU"
      filter   = "(MACAddress=$MACAddress)"
      options  = ignore-from-result ),
    ( phase    = 2
      subtree  = "o=Subscribers,c=AU"
      filter   = "(DevGuids=$1:DevGuid)"
      eis      = Package
      options  = result-required, ignore-from-result ),
    ( phase    = 3
      subtree  = "o=Packages,c=AU"
      filter   = "(PackageName=$2:Package)" ),
    ( phase    = 4
      subtree  = "o=Services,c=AU"
      filter   = "(ServiceName=$3:Services)"
      eis      = Channel)
};
```

In general, a particular View can be invoked by performing an operation that involves one or more directory objects 101 that may or may not be distributed among multiple servers 102. For example, the View described above can be invoked by performing a search of the Channel entries a particular user can access.

In the case of a subtree search, for example, a filter may contain one or more equality filter items that at least match the example filter specified above for the phase 1 search. That is, such a View may be invoked by the following:

ldapsearch -h host -p 30000 -Lb "cn=Channel list,o=Views, c=AU"-s subtree MACAddress=01:02:03 Channel In some cases where the collapse-result option is enabled, such a search could return the following result:

dn: MACAddress=01:02:03,cn=Channel list,o=Views, c=AU
Channel: 1
Channel: 2

In one base-object search example, a filter containing "(objectClass=*)" may be used to read the entry and resolve the View. In some embodiments, the filter in the phase 1 search may be ignored for base-object searches. Base-object searches can be used, for example, to perform simple queries like "(Channel=1)" or "(!(Channel=2))," which may be applied after the view has been resolved. For example, the previously mentioned view can be invoked by the following:

ldapsearch -h host -p 30000 -Lb "MACAddress=01:02:03, cn=Channel list,o=Views,c=AU"-s base (objectClass=*) Channel In some cases, such as, for example, where the collapse-result option may be enabled, such a search could return the following result:

dn: MACAddress=01:02:03,cn=Channel list,o=Views, c=AU
Channel: 1
Channel: 2

In some alternative embodiments, conditions may be attached to the phases of a phased search. For example, some embodiments may add the constructs "if (condition)," then," "else" to control whether a particular phase is executed. Some such conditions may, for example, be of the form "viewAttr operator reg-ex" where "ViewAttr" is the value of an attribute from a previous phase or the original filter, "operator" is equals (=) or not equals (!=) and "reg-ex" is a POSIX regular expression string. Some such "if" statements may, for example, be concatenated (e.g., "else if") or nested. Various embodiments may or may not use the "else" construct.

In various embodiments, attaching conditions to the phases of a phased search may enhance the power and flexibility of some Views. With this capability, Views may effectively become a type of scripting language that may be much more generic and potentially able to solve arbitrary searching problems. For example, conditional phased searching may allow the setting of default values to some retrieved directory objects 101 that may not have a value (e.g., roles) instantiated. Another example feature may be the ability to branch the processing depending on a previous result, such as, for example, direct searches to a different part of a DIT.

The following command language illustrates how some example Views using conditional phased searching may be configured or defined in accordance with particular embodiments.

| | | |
|---|---|---|
| viewDef> | ::= | <string> = { description = <string> entry = <DN> <viewOptions> <viewDef> } |
| <viewOptions> | ::= | options = collapse-result \| remap-originator \| collapse-result-under-entry \| view-entry-access-controls \| NULL |
| <viewDef> | ::= | <viewDefList> \| if (<viewCond>) { <viewDefList> } \| else if (<viewCond>) { <viewDefList> } \| else { <viewDefList> } |
| <viewDefList> | ::= | <viewDefItem> \| <viewDefItem>, <viewDefList> |
| <viewDefItem> | ::= | ( phase = <num> <viewSubtree> <viewScope> <viewFilter> <viewEis> <viewAttrAllow> <viewAttrPrune> <viewMergeDN> <viewDefOptions> ) |
| <viewCond> | ::= | "<viewAttr><viewOper><regexp>" |
| <viewOper> | ::= | = \| != |
| <viewAttr> | ::= | <viewSpecfr><viewPhase>:<attr> <viewTranslation> |
| <viewSpecfr> | ::= | $ \| NULL |
| <viewAttrList> | ::= | <viewAttr> \| <viewAttr>, <viewAttrList> |
| <viewPhase> | ::= | <viewPhaseList> \| NULL |
| <viewPhaseList> | ::= | <num> \| <num>,<viewPhaseList> |
| <viewTranslation> | ::= | [ <viewDelim><num> ] \| NULL |
| <viewDelim> | ::= | <char>: \| NULL |
| <viewSubtree> | ::= | subtree = <DN> \| NULL |
| <viewFilter> | ::= | filter = <string> \| NULL |
| <viewScope> | ::= | scope = <viewScopeItem> \| NULL |
| <viewScopeItem> | ::= | base \| one-level \| subtree |
| <viewEis> | ::= | eis = <attrTypeSet> <viewAttrMapping> \| NULL |
| <viewAttrMapping> | ::= | as <attr> \| NULL |
| <viewAttrAllow> | ::= | allow-attr = <viewAttrList> allow-target = <viewAttr> \| NULL |
| <viewAttrPrune> | ::= | prune-attr = <viewAttrList> prune-target = <viewAttrList> \| NULL |
| <viewMergeDN> | ::= | merge-dn-attr = <attr> \| NULL |
| <viewDefOptions> | ::= | options = <viewOptList> \| NULL |
| <viewOptList> | ::= | <viewOptItem> \| <viewOptItem>, <viewOptList> |
| <viewOptItem> | ::= | ignore-from-result \| result-required \| prune-from-result |

According to a particular embodiment, one example View that attaches conditions to the phases of a phased search using the above command language may be represented in a manner substantially similar to the following:

```
set view "Channel list" = {
   description = "Display list of channels for a given caMACAddress"
   entry = <o Ozcorp><ou Views><cn "Channel list">
   ( phase = 1
      subtree = "ou=Devices,ou=Customers,o=Ozcorp"
      filter = "(caMacAddress=$caMacAddress)"
      options = ignore-from-result
   ),
   ( phase = 2
      subtree = "ou=Subscribers,ou=Customers,o=Ozcorp"
      filter = "(caDeviceId=$1:caDeviceId)"
      options = ignore-from-result
   ),
# This example includes non-normalized values in conditional statements
   if ("$2:caAccountRestrictions=Blocked")
   {
      ( phase = 3
         subtree = "ou=Packages,ou=Services,o=Ozcorp"
         filter = "(caPackagename=information)"
         options = ignore-from-result
      )
   }
# This example includes regexp in conditional statements
   else if ("$2:caAccountRestrictions=R*")
   {
      ( phase = 4
         subtree = "ou=Packages,ou=Services,o=Ozcorp"
         filter = "(caPackagename=standard)"
         options = ignore-from-result
      ),
      ( phase = 5
         subtree = "ou=Restrictions,ou=Services,o=Ozcorp"
         filter = "(caPackageName=$4:caPackageName)"
         options = ignore-from-result
      )
      ( phase = 6
         subtree = "ou=Channels,ou=Services,o=Ozcorp"
         filter = "(caRestrictedChannel=*)"
         eis = caRestrictedChannel
      )
   }
   else
   {
```

-continued

```
    ( phase = 7
      subtree = "ou=Packages,ou=Services,o=Ozcorp"
      filter = " (|(caPackageName=$2:caPackageName)
              (caPackagename=standard))"
      options = ignore-from-result
    )
  }
# This example includes a multi-phase list in a search filter
    ( phase = 8
      subtree = "ou=Channels,ou=Services,o=Ozcorp"
      filter = "(caChannelName=$3,4,7:caChannelName)"
      eis = caChannelNumber
    ),
# This example includes a phaseless prune source
    ( phase = 9
      prune-attr = "caRestrictedChannel"
      prune-target = "$8:caChannelNumber"
    ),
    ( phase = 10
      subtree = "ou=Channels,ou=Services,o=Ozcorp"
      filter = "(&(caChannelNumber=$8:caChannelNumber)
              (caChannelNumber=28))"
      options = prune-from-result
    ),
}
```

In this example, some searches may be started from a base that is determined by an attribute of a previous phase or from the starting filter. In accordance with one embodiment, resolving a DN pointer may be effected in a manner substantially similar to the following:

```
      set view "Auth View 2" = {
        description = "uses seeAlso to determine subtree"
        entry = <o Ozcorp><ou Views><cn "Auth2">
        options = collapse-result, remap-originator
        ( phase = 1
          subtree = "ou=Users,o=Ozcorp"
          filter = "(caUid=$caUid)"
          eis = seeAlso
        ),
        ( phase = 2
          subtree = "$1:seeAlso"
          filter = "(caDeviceId=*)"
          options = result-required
        )
      }
```

In this example, attribute mapping may allow the renaming of an attribute type, which may be useful, for example, in the case that different entries use the same attribute name but for different purposes. For example, if a person and a device are both named by "cn" then the remapping may be effected in various embodiments by renaming the device cn to device-Name in a manner substantially similar to the following:

```
set view "Authorisation" = {
  description = "Provide a view that enables authorisation from a client
          application"
  entry = <o Ozcorp><ou Views><cn "Authorisation">
  ( phase = 1
    subtree = "ou=Users,o=Ozcorp"
    filter = "(caUid=$caUid)"
    eis = commonName as caName
  ),
  ( phase = 2
    subtree = "ou=Users,o=Ozcorp"
    filter = "(caName=$1:caName)"
  )
}
```

In this example, DN merging may allow mapping the DN's of each search result into a DN attribute. For example, a role attribute may be constructed from the names of the group directory objects found in a previous phase, which may be effected in various embodiments in a manner substantially similar to the following:

```
set view "Roles" = {
  description = "Find the groups that a specified user is a member of"
  entry = <o Ozcorp><ou Views><cn "Roles">
  options = collapse-result
  ( phase = 1
    subtree = "ou=Subscribers,ou=Customers,o=Ozcorp"
    filter = "(caSubscriberId=$caSubscriberId)"
    options = result-required, ignore-from-result
  ),
  ( phase = 2
    subtree = "ou=Roles,ou=Users,o=Ozcorp"
    filter = "(member=$1:dn)"
    merge-dn-attr = member
  )
}
```

The example embodiments disclosed herein may thus include any of a variety of features and advantages. In addition to those described above, the features or advantages of various embodiments may include one or more of the following: parallel views, extended controls, access controls, alternative mapping, EIS handling, search branching, refinement, performance optimizations, value translation, aggregation, multiple-link capabilities, integrity enhancements, browsing capabilities, class of service, overlay, any combination of the preceding, or any other of a variety of features and advantages. In some cases, these example features and advantages may be summarized as follows.

In some embodiments, the first phase of a multi-phased search may result in a single entry, which may then be used in subsequent phases; and a collapse-result may ensure that a single entry is returned from a multi-phased search. Various embodiments may be capable of effecting parallel Views, meaning that a View may be applied for each result in a particular phase. Thus, if a first phase returns five entries and collapse-result is enabled, then five entries may be returned such that each entry corresponds to a respective application of the View.

Various embodiments may include at least the following extended operations: bind, compare, modify, and modifyDN. For example, in some embodiments a target entry may exist under a View entry. In this case, the actual target entry may be found, for example, by replacing the ViewDN with the DN of the result of the View. In other words, the target entry may be split into ViewDN+RemainingDN, the ViewDN may be resolved to ViewResultDN, and the operation may be applied to the entry ViewResultDN+RemainingDN. In some embodiments, binds and compares may be implemented by resolving the View and then post-processing the result. In another example, a modification may be implemented by determining which entry to update from a group of multiple entries. In yet another example, an attribute may be added by passing in a list of modifiable attributes for each phase and then selecting a particular attribute from the list to receive the added attribute.

In various embodiments, access controls may be implemented, for example, by performing all phases of the View searches using the credentials of the user invoking the view. To illustrate using one of the above examples, a parent may key in an access code to a remote control, thereby establishing credentials that ultimately enable a wider range of movie selections. In some embodiments, access controls may have the advantage of maintaining security that is enforced by a directory, such as, for example, directory information system 100.

In some embodiments, alternative mapping may be implemented, for example, such that the attributes used to link directory objects do not necessarily require the same attribute type. For example, linking may be implemented at a syntax-normalized value level. To illustrate, one search may return employee names, and a subsequent search may determine a particular employee is a manager and thus search for other directory objects. Such a feature may have the advantage, for example, of being able to link together any attribute types that can have the same or similar values. In some cases, attributes may be mapped on a final result. For example, userName may be returned as commonName.

EIS handling may be implemented in any of a variety of ways. For example, if an EIS is passed in on a View search, then all phase searches may include such an EIS; and such phase searches may further include any linking attributes not otherwise present, which may override an EIS, if any, specified for each phase. However, if no EIS is passed in on a View search, then the phase search may include, for example, any phase EIS attributes in addition to any linking attributes not otherwise present.

In various embodiments, search branching may occur, for example, if a phase search returns multiple entries with the same linking attribute, or the phase search returns a linking attribute with multiple values. Such branching may occur, for example, when the relationship between directory objects is one-to-one (1:1) or many-to-many (n:n). When branching occurs, a subsequent phase in a search may contain an "OR" condition in the filter. For example, two entries (e.g., Entry 1 and Entry 2) may be returned with "attr" is the linking attribute. More specifically, the first entry (Entry 1) may have the following example attributes: "attr=1," "attr=2;" and the second entry (Entry 2) may have the attribute "attr=3." If, for example, the next phase search filter is "attr=$attr" then the search performed may have the filter "(|(attr=1)(attr=2)(attr=3))."

In some embodiments, refinement may be implemented using a View search filter capable of specifying multiple items, such that subsequent search phases can reference these items to refine the search results. For example, if the View search filter is "(&(attr1=x)(attr2=y))," then subsequent searches may use x and y in their filters. This is one example way of passing parameters into the View.

Various embodiments may have any of a variety of performance optimizations. For example, in some embodiments, search phases may be performed in parallel, meaning some phases of a multi-phased search may not necessarily be performed sequentially in serial fashion. In this manner, as soon as a search result is returned, for example, any further phase reliant on the result and not waiting for any other phase may proceed. In another performance optimization example, if an "ignore-from-result" option is specified, then the EIS for the search may only include the linking attributes. By way of contrast, if a "prune-from-result" option is specified, then the search may only return entries and no attributes. In still another optimization example, attributes used in filters may be indexed and the returned attributes may be cached, which may result in enhanced efficiency for search queries.

In some embodiments, value translation may allow at least a part of a value to be used on a View search. The part of the value may be determined, for example, via a delimiter. For example, "$3:restriction[|:1]" may receive a "field one" from the value of restriction returned by a phase 3 search delimited by a "|" symbol (i.e., the value "service|01012007|didn't pay bill" may translate to "service").

Aggregation may be implemented in any of a variety of ways. For example, a View search may be performed with an EIS that contains a special operational count attribute, such as "EIS=dxEntryCount." A count of the entries that can be returned by such a View search may be returned on the base object of a View entry.

In various embodiments, multiple links may be configured as one or more filter items, which filter item(s) may reference results from a previous phase or from previous phases. In some embodiments, such a feature may be useful if multiple attributes define a link between entries, as opposed to a single linking value.

The data integrity of some embodiments may be enhanced, for example, by enforcing a "unique-attrs" setting to values that may be expected to be enforced globally. In this manner, unexpected results may be prevented when the linking attributes are expected to be unique, but may in fact not be unique. In some embodiments, such a feature may be useful to enforce a many-to-one relationship (n:1).

Browsing a particular View may be implemented in any of a number of ways. In some embodiments, for example, a directory information tree (DIT) may be generated using a View entry. For example, an organization in a directory may have a hierarchy of organizational units and people objects. A user may wish, however, to view the organization of the directory by location. Accordingly, a View may be executed using a View entry; and a user viewing a client display can thus be given the impression that the directory has an organization that differs in one or more aspects from the way the directory is actually organized. In another example, a client application (e.g., View Application 116) may enable a View of one or more customers sets based on attributes in the customer entries as if those attributes formed a hierarchy when in actuality they do not. Such a feature may be particularly useful, for example, in some larger directory-based systems.

In various embodiments, a class of service feature may allow the value of an attribute to include other entries or one or more attributes from those entries. For example, when reading information pertaining to employees that each have as an attribute "office-code=1234," all attributes from another entry associated with that same office (e.g., fax, secretary, printer, etc.) may also be returned. Such a feature may have the advantage of not necessarily needing to store common attributes in all individual employee entries that have that particular office-code.

Some directories having an overlay feature may be capable, for example, of augmenting entries in another directory that may have extra attributes (e.g., a third-party directory). In this manner, the schema of a directory may be extended. Views can be used to achieve this overlay feature, for example, by storing entries in another directory instance that share one or more unique values with the third-party directory. A View can be created to retrieve the two linked entries.

It should be noted that where the terms "server," "computer," or similar terms are used herein, a communication device is described that may be used in a communication system and should not be construed to limit the present disclosure to any particular communication device type. Thus, a communication device may include, without limitation, a bridge, router, bridge-router (router), switch, node, or other communication device, which may or may not be secure.

It should also be noted that where a flowchart is used to demonstrate various aspects of the present disclosure, it should not be construed to limit the present disclosure to any particular logic flow or logic implementation. The described logic may be partitioned into different logic blocks (e.g., programs, modules, functions, or subroutines) without changing the overall results or otherwise departing from the true scope of the present disclosure. Often, logic elements may be added, modified, omitted, performed in a different order, or implemented using different logic constructs (e.g., logic gates, looping primitives, conditional logic, and other logic constructs) of the present disclosure.

Various embodiments may be embodied in many different forms, including computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a particular embodiment, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g, a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including, for example, programmable logic for use with a programmable logic device) implementing all or part of the functionality where described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method of executing an operation in a directory information system, comprising:
   receiving a request to perform a predetermined procedure, wherein the predetermined procedure comprises a first operation and a second operation;
   performing the first operation within a directory information system in accordance with the predetermined procedure, the first operation comprising a search for one or more of a plurality of directory objects, the plurality of directory objects being stored in a computer-readable medium having a directory information structure, the search generating one or more first results;
   performing the second operation within the directory information system in accordance with the predetermined procedure, the second operation using a portion of the one or more first results generated by the search for the one or more of the plurality of objects, the second operation generating one more second results, the second results comprising additional results that are exclusive of the first results;
   generating a virtual directory view of the directory information system, the virtual directory view comprising:
      a virtual directory hierarchy based on the portion of the one or more first results, wherein the virtual directory hierarchy differs from the directory information structure; and
      the one or more first results and the one or more second results organized according to the virtual directory hierarchy;
   returning the virtual directory view; and
   modifying the directory information structure, wherein modifying the directory information structure does not affect the virtual directory view.

2. The method of claim 1, wherein the predetermined procedure further includes a third operation, the method further comprising performing the third operation in accordance with the predetermined procedure, the third operation based on the one or more second results, and wherein a portion of the second operation is executed in parallel with a portion of the third operation.

3. The method of claim 1, wherein the portion of the one or more first results generated by the search comprises one or more components selected from a group consisting of an attribute value, an attribute, and a distinguished name (DN).

4. The method of claim 1, wherein performing the second operation further comprises selecting the second operation based at least in part on an input received from a client.

5. The method of claim 1, wherein the performing the second operation further comprises selecting the second operation based at least in part on a distinguished name (DN) of the second operation.

6. The method of claim 1, wherein the search comprises:
a scope selected from the group consisting of a base-object, a one-level, and a sub-tree; and
one or more filters, each filter comprising one or more operators and one or more conjunctions; and
an Entry Information Selection (EIS) based at least in part on one or more parameters associated with the second operation, wherein the EIS determines one or more attributes returned in at least one result of the one or more first results of the first search.

7. The method of claim 1, wherein the performing the first operation and the second operation further comprises performing the search and the second operation using at least two directory objects of the plurality of directory objects, the at least two directory objects each having a common attribute.

8. The method of claim 1, wherein the second operation comprises another search for one or more of another plurality of directory objects.

9. The method of claim 1, wherein the second operation comprises pruning at least one result of the one or more first results to generate at least a portion of the second results.

10. The method of claim 1, wherein at least one result of the one or more second results comprises at least two directory objects of another plurality of directory objects stored in the computer-readable medium of the directory information system, each of the at least two directory objects differing in at least one attribute.

11. The method of claim 1, wherein the second operation further comprises merging at least two directory objects of the plurality of directory objects, the at least two directory objects having a same Distinguished Name (DN).

12. The method of claim 1, wherein the second operation further comprises collapsing at least two directory objects of the plurality of directory objects into one object.

13. The method of claim 1, wherein at least one of the first and second operations comprise one or more respective conditions, the one or more respective conditions determining whether at least a portion of the at least one of the first and second operations is executed.

14. A directory information system comprising:
a computer-readable medium of one or more data repositories of a directory information system, the computer-readable medium storing a plurality of directory objects, a first directory object of the plurality of directory objects logically linked to a second directory object of the plurality of directory objects in a hierarchical configuration;
one or more processors configured to execute logic embodied in the computer-readable medium, the logic configured, when executed by the one or more processors, to:
receive a request to perform a predetermined procedure, wherein the predetermined procedure comprises a first operation and a second operation;
perform the first operation using the computer-readable medium of the one or more data repositories of the directory information system, the first operation performed in accordance with the predetermined procedure, and the first operation comprising a search for one or more of a plurality of directory objects, the search generating one or more first results;
perform the second operation using the computer-readable medium of the one or more data repositories of the directory information system, the second operation performed in accordance with the predetermined procedure, the second operation further using a portion of the one or more first results generated by the search for the one or more of the plurality of directory objects, and the second operation generating one more second results, the second results comprising additional results that are exclusive of the first results;
generate a virtual directory view of the directory information system, the virtual directory view comprising:
a virtual directory hierarchy based on the portion of the one or more first results, wherein the virtual directory hierarchy differs from the directory information structure; and
the one or more first results and the one or more second results organized according to the virtual directory hierarchy;
return the virtual directory view; and
normalize the directory information structure, wherein normalizing the directory information structure does not affect the virtual directory view.

15. The directory information system of claim 14, wherein the first directory object comprises a set of instructions configured to resolve the logical link to the second directory object.

16. The directory information system of claim 15, wherein the predetermined procedure further includes a third operation, wherein the logic is further configured, when executed by the one or more processors, to perform the third operation with the computer-readable medium of the one or more data repositories of the directory information system, the third operation using a portion of the one or more second results generated by the second operation, and wherein the logic is further configured, when executed by the one or more processors, to perform a portion of the second operation in parallel with a portion of the third operation.

17. The directory information system of claim 14, wherein the logic is further configured, when executed by the one or more processors, to provide the first search based at least in part on an input received from a client.

18. The directory information system of claim 14, wherein at least one result of the one or more second results comprises at least two directory objects of another plurality of directory objects embodied in the computer-readable medium of the one or more data repositories of the directory information system, each of the at least two directory objects differing in at least one attribute.

19. The directory information system of claim 14, wherein the logic is further configured, when executed by the one or more processors, to perform the second operation by selecting the second operation based at least in part on a distinguished name (DN) of the second operation.

20. The directory information system of claim 14, wherein the logic is further configured, when executed by the one or more processors, to perform the second operation by collapsing at least two directory objects of the plurality of directory objects into one directory object.

21. The directory information system of claim 14, wherein the logic is further configured, when executed by the one or more processors, to prune at least one result of the one or more first results to generate at least a portion of the second results.

22. The directory information system of claim 14, wherein at least one of the first and second operations comprise one or more respective conditions, the one or more respective conditions determining whether at least a portion of the at least one of the first and second operations is executed.

23. Logic embodied in non-transitory, computer-readable medium and configured, when executed by one or more processors, to:
    receive a request to perform a predetermined procedure, wherein the predetermined procedure comprises a first operation and a second operation;
    perform the first operation within a computer-readable medium of one or more data repositories of a directory information system, the first operation performed in accordance with a predetermined procedure, and the first operation comprising a search for one or more of a plurality of directory objects, the search generating one or more first results;
    perform the second operation within the computer-readable medium of the one or more data repositories of the directory information system, the second operation performed in accordance with the predetermined procedure, the second operation using a portion of the one or more first results generated by the search for the one or more of the plurality of directory objects, and the second operation generating one more second results, the second results including additional results that are exclusive of the first results;
    generate a virtual directory view of the directory information system, the virtual directory view comprising:
        a virtual directory hierarchy based on the portion of the one or more first results, wherein the virtual directory hierarchy differs from the directory information structure; and
        the one or more first results and the one or more second results organized according to the virtual directory hierarchy;
    return the virtual directory view; and
    normalize the directory information structure, wherein normalizing the directory information structure does not affect the virtual directory view.

24. The logic of claim 23, wherein at least a first directory object of the plurality of directory objects is logically linked to at least a second directory object of the plurality of directory objects in a hierarchical configuration, the at least a first directory object comprising a set of instructions configured to resolve the logical link to the at least a second directory object.

* * * * *